United States Patent
Bangalore et al.

(10) Patent No.: US 8,082,151 B2
(45) Date of Patent: Dec. 20, 2011

(54) SYSTEM AND METHOD OF GENERATING RESPONSES TO TEXT-BASED MESSAGES

(75) Inventors: Srinivas Bangalore, Morristown, NJ (US); Mazin Gilbert, Warren, NJ (US); Narendra Gupta, Dayton, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1042 days.

(21) Appl. No.: 11/857,036

(22) Filed: Sep. 18, 2007

(65) Prior Publication Data

US 2009/0076795 A1    Mar. 19, 2009

(51) Int. Cl.
*G10L 15/00* (2006.01)
(52) U.S. Cl. .......... 704/251; 704/257; 709/223
(58) Field of Classification Search .......... 704/251, 704/257; 709/223
See application file for complete search history.

(56) References Cited

U.S. PATENT DOCUMENTS

| | | | |
|---|---|---|---|
| 5,895,466 A | 4/1999 | Goldberg et al. | |
| 5,966,686 A | 10/1999 | Heidorn et al. | |
| 6,505,158 B1 * | 1/2003 | Conkie | 704/260 |
| 6,549,612 B2 | 4/2003 | Gifford et al. | |
| 6,718,367 B1 | 4/2004 | Ayyadurai | |
| 6,718,368 B1 | 4/2004 | Ayyadurai | |
| 6,839,717 B1 | 1/2005 | Motoyama et al. | |
| 6,925,454 B2 * | 8/2005 | Lam et al. | 706/45 |
| 7,013,427 B2 | 3/2006 | Griffith | |
| 7,099,855 B1 | 8/2006 | Nelken et al. | |
| 7,103,599 B2 | 9/2006 | Buford et al. | |
| 7,162,473 B2 | 1/2007 | Dumais et al. | |
| 7,188,064 B2 | 3/2007 | Golden et al. | |
| 7,197,460 B1 | 3/2007 | Gupta et al. | |
| 7,475,109 B1 * | 1/2009 | Fletcher et al. | 709/204 |
| 7,644,057 B2 * | 1/2010 | Nelken et al. | 706/55 |
| 7,752,159 B2 * | 7/2010 | Nelken et al. | 706/62 |
| 2002/0035607 A1 * | 3/2002 | Checkoway et al. | 709/206 |
| 2005/0187913 A1 * | 8/2005 | Nelken et al. | 707/3 |
| 2006/0167834 A1 * | 7/2006 | Rubel | 707/1 |
| 2008/0208992 A1 * | 8/2008 | Madnani | 709/206 |

OTHER PUBLICATIONS

Haffner, Patrick, et al., Bag-of-Words Lexical Choice using Large Scale Classifiers; AT&T Labs—Research; pp. 1-2, Oct. 2006.
Bangalore, Srinivas, et al., "Extracting Clauses in Dialogue Corpora ; Applications to Spoken Language Understanding", TAL Special Issue on Speech Processing, pp. 1-23, Sep. 2004.

\* cited by examiner

*Primary Examiner* — Daniel D Abebe
(74) *Attorney, Agent, or Firm* — Hoffmann & Baron, LLP

(57) ABSTRACT

In accordance with one aspect of the present invention, an automated method of and system for generating a response to a text-based natural language message is disclosed. The method includes identifying a sentence in the text-based natural language message. Also, identifying an input clause in the sentence. Further, comparing the input clause to a previously received clause, where the previously received clause is correlated with a previously generated response message. Additionally, generating an output response message based on the previously generated response message. The system includes means for performing the method steps.

20 Claims, 4 Drawing Sheets

SYSTEM AND METHOD OF GENERATING RESPONSES TO TEXT-BASED MESSAGES

BACKGROUND OF THE INVENTION

1. Field of the Invention

The present invention generally relates to a fully and/or at least partially automated method and system for responding to text-based messages, and particularly natural language messages. For example, the present invention is particularly suited for handling and analyzing customer e-mail messages, inquiries or requests and optimizing the generation of a uniform, fully responsive and appropriate response.

2. Brief Description of the Related Art

Many businesses in the service and manufacturing sectors that deal with customers emphasize the importance of improving customer care. However, there is competing pressure to reduce the cost of such services. There is a growing trend to move customer care from human operators to automated call centers when a customer is using a telephone channel. However with the ubiquitous availability of networked computing devices which have more bandwidth than conventional telephone channels, there is a great opportunity to provide better customer experience with rich and pertinent content embedded in e-mails or other text-based customer care messages. Also, providing text-based customer care messages can significantly reduce the overall cost of customer care services since it allows for asynchronous interaction with customers permitting for multitasking on the part of the customer care agent.

One contemporary approach to responding to customer text-based natural language messages, such as e-mails, instant messages or other text messages, involves a customer care agent reading the e-mails; and preparing individual responses from scratch to address the issues raised in the incoming customer's e-mail. As these messages are natural language messages, generally written in some form of prose or other form of contemporary written communication, they are typically analyzed by a human rather than a machine. This approach does not take advantage of similar messages to which responses were previously generated and transmitted to the customer.

Another approach employs a database of pre-formed boilerplate response messages that the agent can edit in order to more fully address the customer's issues before sending it as a formal response. This approach can expedite the process for the customer care agent, but often involves rewriting most of the preformed template or cutting and pasting a number of such template responses. Such an approach is still labor intensive and promotes inconsistencies between responses of different customer care agents generating them.

There is therefore a need for an efficiency enhancing system for generating responses to customer text-based natural language messages. Such a system preferably takes advantage of a collection of prior customer e-mails and corresponding agent responses. The collection is segmented, parsed and indexed such that incoming customer e-mails can be similarly analyzed and a new response automatically generated.

SUMMARY OF THE INVENTION

In accordance with one aspect of the present invention, an automated method of generating a response to a text-based natural language message is disclosed. The method includes identifying a sentence in the text-based natural language message. Also, identifying an input clause in the sentence. Further, comparing the input clause to a previously received clause, where the previously received clause is correlated with a previously generated response message. Additionally, generating an output response message based on the previously generated response message.

In accordance with another aspect of the present invention, an automated system is described for modeling responses to text-based messages. The system includes means for identifying a sentence in the text-based natural language message. Also, the system includes means for identifying an input clause in the sentence. Further, the system includes means for comparing the input clause to a previously received clause, where the previously received clause is correlated with a previously generated response message. Additionally, the system includes means for generating an output response message based on the previously generated response message.

In accordance with yet another aspect of the present invention a computer-readable storage medium is described that maintains instructions. Accordingly, execution of the instructions by at least one processing device generates a response to a text-based natural language message. The response is generated by means for identifying a sentence in the text-based natural language message. Also, means for identifying an input clause in the sentence are used. Further, means for comparing the input clause to a previously received clause are used, where the previously received clause is correlated with a previously generated response message. Additionally, means for generating an output response message based on the previously generated response message are used.

Additionally, the methods, systems and computer-readable medium described above can include steps and/or features such that the previously received clause and the previously generated response are stored in a database. Also, the input clauses can be parsed thereby defining a relationship between words in the input clause. Further, a best match clause can be identified for the input clause, wherein the best match clause is derived from the previously received clauses. Further still, the previously received clause can be correlated with a previously generated response clause. Yet further still, the output response message can be derived from a plurality of previously generated response clauses. Yet further still, a semantic tag can be associated with the input clause and an output response clause can be identified based on the associated semantic tag. Additionally, the semantic tag can be correlated with the previously received clause. Yet even further still, the output response can be displayed to a customer service agent for at least one of reviewing and editing the response. Also, the reviewed and/or edited response can be transmitted to a customer.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

The instant invention provides a method and system for automatically synthesizing a response to a customer's e-mail by exploiting historical e-mail exchanges between customers and customer care agents. Using an automated system, the invention generates a response to customer text-based messages by analyzing the linguistics of the message, including its sentences, clauses, words and/or the interrelationship of some or all of those aspects of the message. Those aspects are then correlated to one or more responses from a repository of historical messages, to and from the customer, containing similar aspects. In this way an automated response can be generated that fully addresses incoming customer text-based messages.

The availability of large volumes of saved text-based messages between a business and its customers is well suited for data-driven techniques for processing text-based natural language messages. The present invention uses a method for extracting clauses from text corpora. The resulting system can even be used to enrich a corpus used for spoken language understanding.

Written messages are preferably broken down through a syntactic and/or a semantic analysis. The syntactic analysis transforms the user's message into a representation that is suitable for the semantic analysis to produce further interpretations thereof. Further interpretations are often needed to accommodate for the characteristic features of human messages. Most notable of such features are (a) ungrammaticality, and (b) unpredictable typographical or other word errors. These features can make the word strings syntactically and semantically incoherent.

Figure 1:
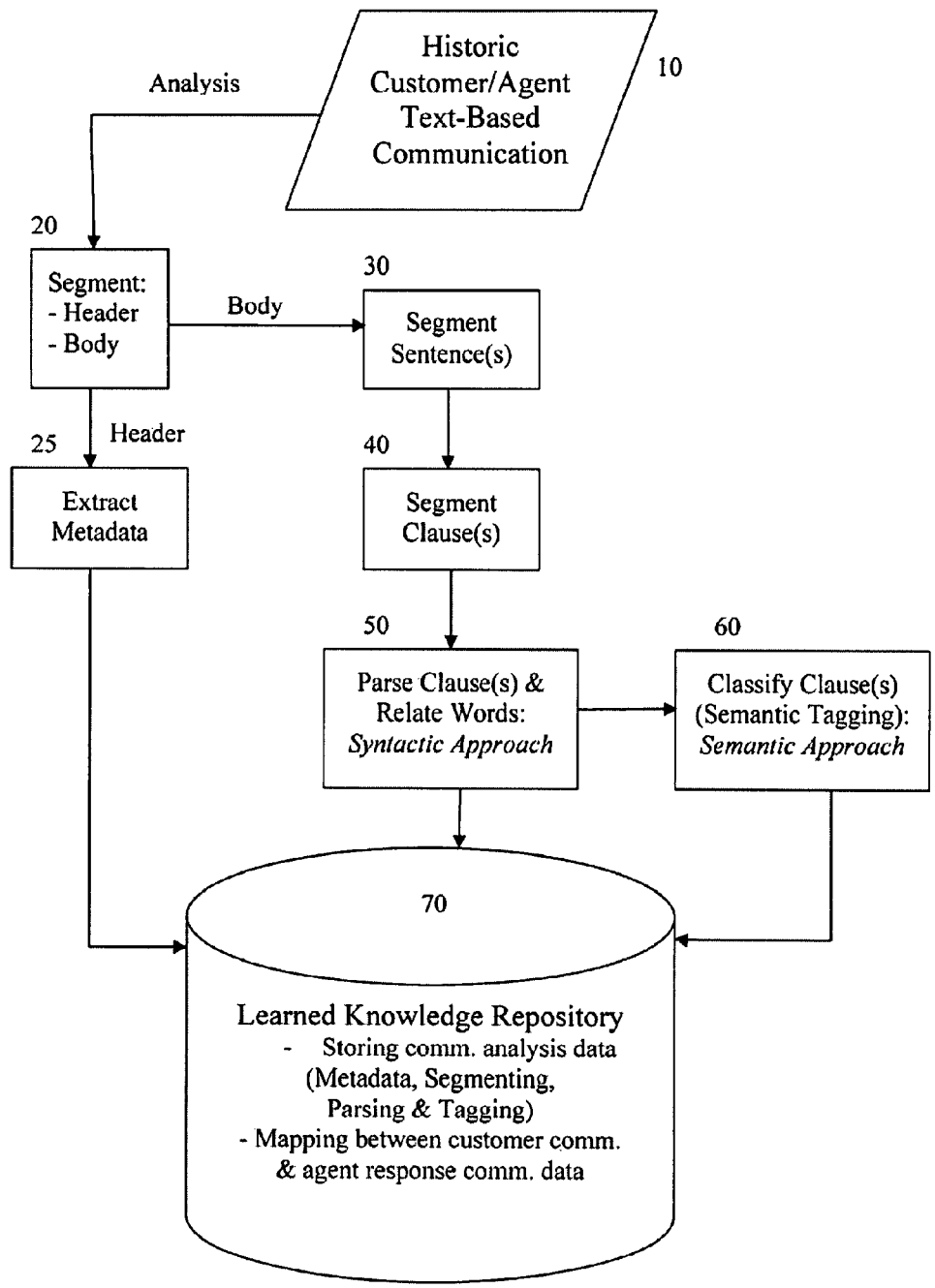
FIG. 1 is a block diagram that shows the analysis of a historical set of customer/agent text-based messages stored in a learned knowledge repository in accordance with the present invention.

As shown in FIG. 1, a set of archival or historical text-based messages 10 are analyzed. Preferably the archive includes application specific customer messages as well as corresponding agent response messages. Each text-based message preferably consists of a single document, such as an email from or to a customer. It is desirable that the analysis begin by general segmenting 20 of each message. The general segmenting 20 involves separating header or subject line of a message from the body. In this way the header is extracted 25 to provide metadata that is helpful in understanding a customer message and is used when forming a response or further messages relating to the original. In other words, the header generally provides information that describes the body of the message. The extracted header metadata 25 is stored, along with other analytical information derived from the message in the learned knowledge repository 70. It should be understood that the header could alternatively be further analyzed, as described below for the body of the message. Regardless, the body of the message is preferably dissected through further analysis.

Preferably, the body undergoes sentence segmenting 30. The text is segmented into sentences using indicators such as the sentence final punctuation marks (period, question mark, semi-colon and others), capitalization of the succeeding character and/or the presence of paragraph indentation. These indicators are combined using machine learning methods to produce a classifier that decides if a word boundary is also a sentence boundary. Preferably, the text body is annotated to indicate sentence boundaries. For example, the tag <s> can be added to delineate the start and/or finish of each sentence. Thereafter, each sentence undergoes clausification or clause segmenting 40.

Clausification takes a string of text, preferably at least one delineated sentence, and generates at least one clause as its output. The term clause preferably represents a segment of a message that has a subject and a predicate. However, due to typographical errors and/or alternative formats often associated with the means of communication, such as instant messaging or mobile text messaging, incomplete segments can also be considered a clause. It should be understood that the system, process or steps by which clauses are extracted is referred to herein as a clausifier, clausification or a clausifying. More specifically, the clausifier 40 annotates its output with tags that help in segmenting part(s) of a message into clauses. For example, strings can be added between clauses, such as {c _____ }, {f _____ } and {d _____ }, respectively represent coordinating conjunctions, filled pauses and discourse markers (the blank spaces used for associated text, see examples below). These syntactic tags are then interpreted to retrieve the set of clauses. An example illustrating the input, the annotated output and the set of clauses resulting from interpreting the output is shown below.

An example of a clausifier Input follows:
I am I am supposed to be on the company $50/month rate unlimited uh calls in-state charge, but you have been charging me $100/month and I am I am on the $100/month out-of-state plan which is correct but I need somebody to change that from $100 to $50 and go back and look at the history of my account and give me a credit for all the over charge of $100/month you been charging now that should not be hard to understand An example of a clausifier annotated output follows:
[ I am ] I am supposed to be on the company $50/month rate unlimited calls {f uh } in-state charge [ but ] <s> you have been charging me $100/month {c and} [I am ] {f uh } I am on the $100/month out-of-state plan which is correct {c but } I need somebody to change that from $100 to $50 {c and } go back {c and } look at the history of my account {c and } give me a credit for all the over charge of $100/month you been charging <s> {d now } that should not be hard to understand Syntactic Tags above: <s>: Sentence boundary; {c and, but}: Coordinating Conjunctions; {f uh}: Filled pause; {d now}: Discourse markers; [ ]: Edit Once the clause segmenting 40 is complete, a syntactic analysis 50 is conducted. The syntactic analysis 50, also referred to as a syntactic approach, parses the clauses and further analyzes them to define word structure and relationships. An example of a clausified parsed output follows:
I am supposed to be on the company $50/month rate unlimited calls in-state charge
you have been charging me $100/month
I am on the $100/month out-of-state plan which is correct
I need somebody to change that from $100 to $50
go back
look at the history of my account
give me a credit for all the over charge of $100/month you been charging
that should not be hard to understand Further details on clausification are disclosed in the article "Extracting Clauses in Dialogue Corpora: Applications to Spoken Language Understanding," TAL Special issue on Speech Processing, Sep. 15, 2004, by Srinivas Bangalore and Narendra Gupta.

A further example of clausification is provided below. This example illustrates not only the clausification of a customer inquiry, but also the related response message is also segmented into clauses. Messages A and B below are shown in their original format, while messages C and D are the clausified parsed versions, respectively of A and B.

Message A: Customer Incoming Email:
Email Tracking Number: 12345
Question/Comment: I am trying to pay my bill online and I am having such a problem with this.
Additional Information: I am trying to pay my bill online and I cannot seem to get this right. Can someone please help me so I can so this. I do not have my bill with me at this time.
Message B: Agent Outgoing Response Email:
Thank you for your recent email about a payment. I apologize for the difficulty you have had with making your payment. I am totally committed to helping you with your issue I have investigated your account and found you did successfully make your payment today. If this response does not address your concern, please reply directly to this email. To ensure a timely response, do not change the subject line of your reply. If you have additional questions, you can also visit:
http://sbc.com/contactus or call 1-800-288-2020.
Thank you for choosing our services, we appreciate your business and continued loyalty.
Regards,
Your Customer Service Representative
Message C: Customer Incoming Email
Clausified-Parsed
Email Tracking Number: 12345
Question/Comment:
I am trying to pay my bill online
I am having such a problem with this
Additional Information:
I am trying to pay my bill online
I cannot seem to get this right
Can someone please help me
I can do this
I do not have my bill with me at this time
Message D: Agent's Outgoing Response Email
Clausified-Parsed:
Thank you for your recent email about a payment
I apologize for the difficulty you have had with making your payment
I am totally committed to helping you with your issue
I have investigated your account
found you did successfully make your payment today
If this response does not address your concern
please reply directly to this email
To ensure a timely response
do not change the subject line of your reply
If you have additional questions
you can also visit: http://sbc.com/ contact us or call 1-800-288-2020
Thank you for choosing AT&T
we appreciate your business and continued loyalty
Regards
Your Customer Service Representative The parsed clauses in 50 are preferably also analyzed to define word structure and relationships, such as predicates and arguments. The clauses are parsed into predicates and arguments using a natural language parser that extracts the verb (which serves as the predicate) and the arguments of the verb. The arguments of the verb can further be annotated using labels such as subject, object, indirect object and others. For example, the verb "make" is a transitive verb that requires the subject and an object argument both of which are noun phrases. Thereafter, the parsed clauses along with their structuring and relationship information derived from this syntactic analysis 50 are stored in the learned knowledge repository 70.

Alternatively, once the syntactic analysis 50 is complete, a semantic analysis 60 is conducted. A semantic analysis 60, also referred to as a semantic approach, adds one or more semantic tags to the parsed clauses 50. Each semantic tag preferably summarizes or captures the writer's (i.e., the customer's or the agent's) intent and provides categories with which the clauses 50 can be grouped, sorted, searched and analyzed. The set of semantic tags are compiled based on the needs of the application. Often times they are designed to capture both communicative speech acts, such as acknowledgements, questions, clarifications and others, but also to capture application specific information such as bill payment, call transfer, and others. Some examples of tags and their general meaning follow:

| Tags | Meaning |
| --- | --- |
| reqexpl | request explication/explanation (presupposes some sort of problem) |
| reqinfo | request information (does not presuppose problem) |
| reqadj | request money (e.g., adjustment, credit, refund) |
| reqother | request change in plan, cancellation, customer info update, preferred mode of contact or customer problem |
| bkgrnd | whatever history is described by customer as relevant to problem |
| topic | general subject matter of email |
| geninfo | general company information |
| acctinfo | information specific to a particular customer account |
| instr | instructions |
| frustrex | frustration |
| politex | politics |
| acknldgmnt | acknowledgment |
| apology | apology |
| prsnlstory | personal details/narratives |

The clauses are annotated with semantic tags using a classifier that is trained on annotated data that associates clauses with semantic tags. The annotated data is used to train a classifier that predicts the tag for new clauses. Clauses annotated with semantic tags are used as training data for machine learning programs that extract indicator functions from the clauses (such as the words in the clause, the length of the clause, the syntactic structure of the clause) and learn a function that minimizes the prediction error of the semantic labels on the training data. Further details on training data and machine learning are disclosed in the text "Pattern Recognition and Machine Learning" by Christopher M. Bishop (Springer Science+Business Media, LLC, 2007). Semantic tags preferably translate to a fixed set of labels that are application-specific and might be tightly coupled with the business logic, as illustrated in the following example. The example is taken from a customer care application and is annotated with two application-specific classes (Unrecognized-Number, Billing-Credit).

I want them these charges taken off because
I did not make those calls

The first clause is preferably tagged "Unrecognized-Number", while the second clause is preferably tagged "Billing- Credit." Thereafter, the tagged clauses derived from this semantic analysis 60 is stored in the learned knowledge repository 70, along with any metadata 25, sentence segmentation 30, clause segmentation 40 data and clausification 50 data discussed above.

The learned knowledge repository 70 stores the information extracted from the set of historical text based messages to assist in preparing responses to new customer messages. Preferably, the repository 70 also stores newly received messages as well as the prepared responses. Over time, the repository 70 compiles and stores larger and larger volumes of messages. Thus, increasing the likelihood that a new customer queries or at least parts thereof were previously addressed by messages stored in the repository 70.

Figure 2:
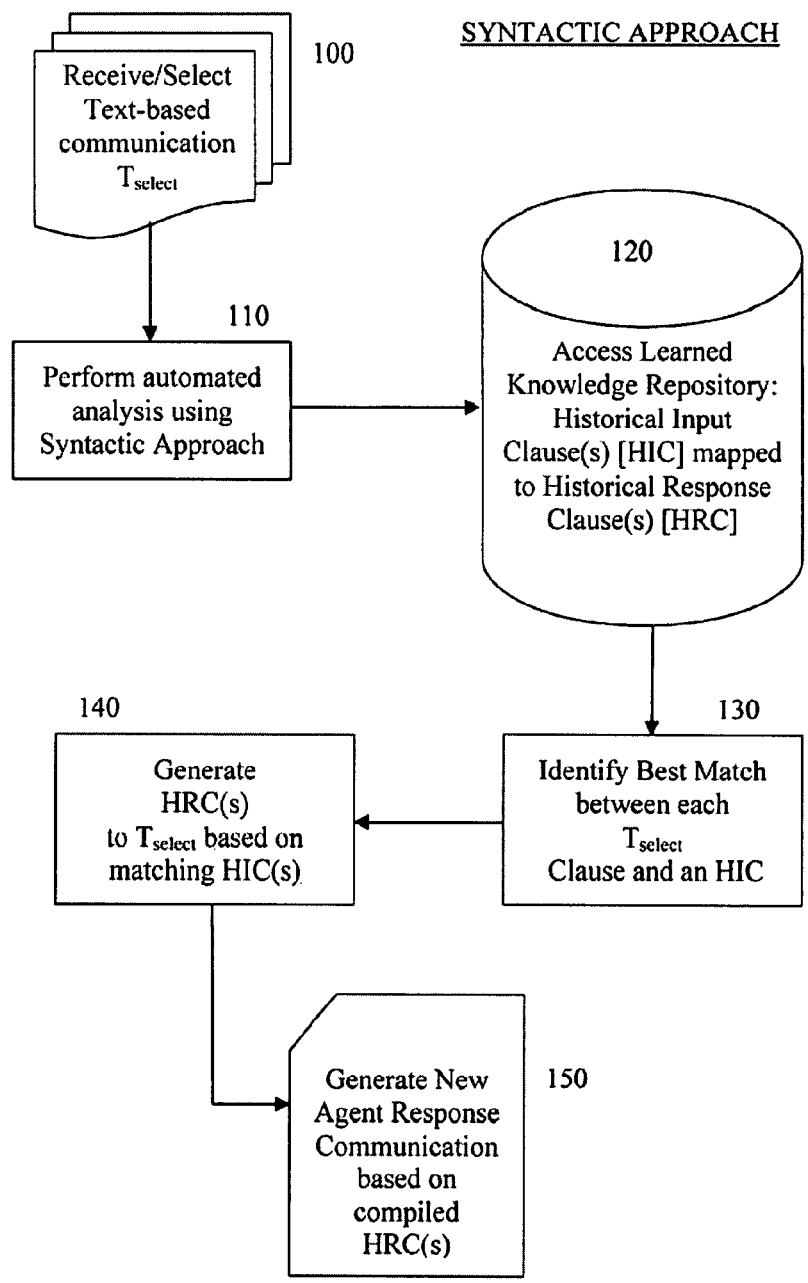
FIG. 2 is a block diagram that shows a response message generated for a received/selected text-based message based on matching clauses from previously analyzed messages stored in a learned knowledge repository in accordance with the present invention.
Figure 3:
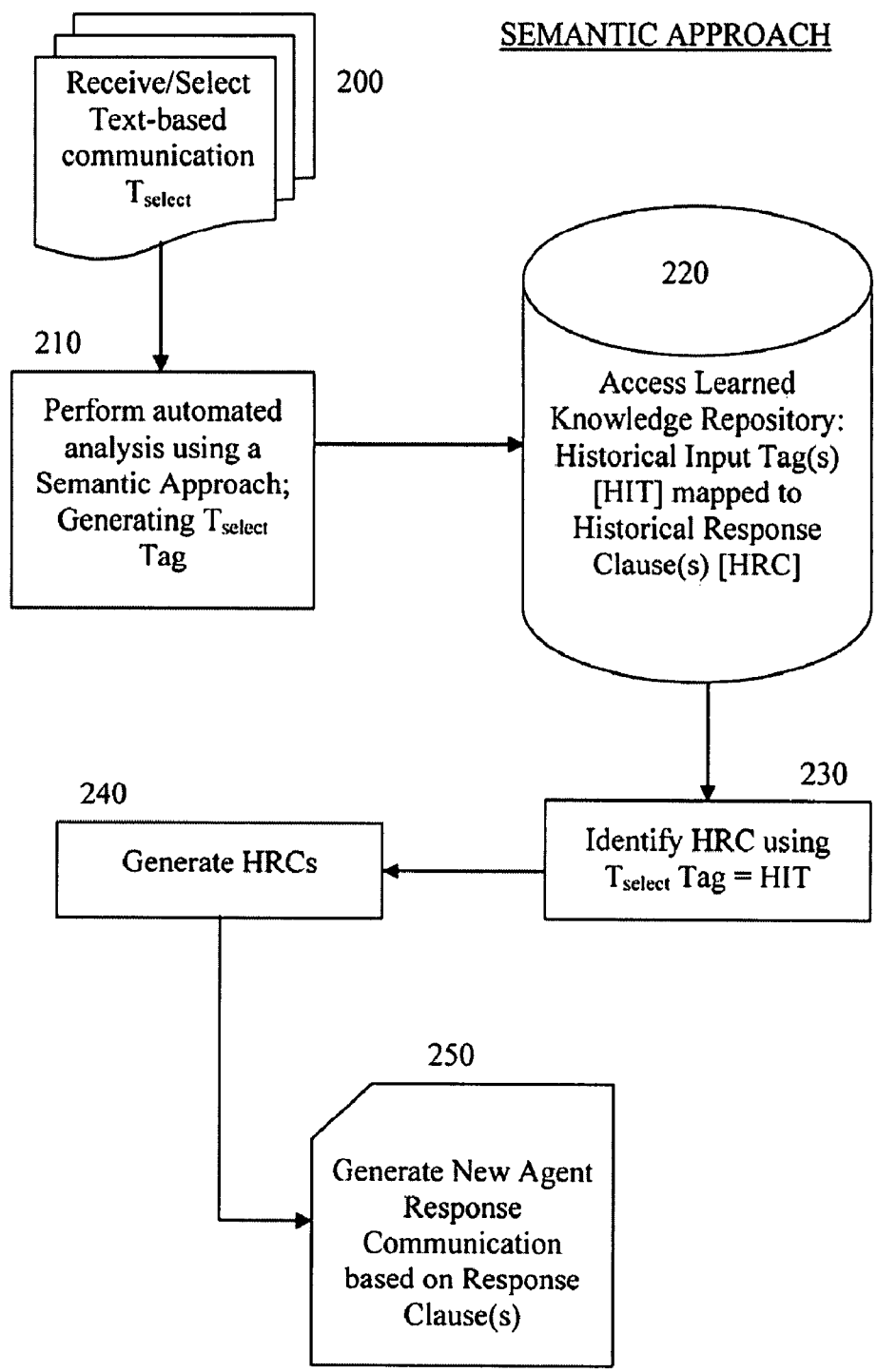
FIG. 3 is a block diagram that shows a response message generated for a received/selected text-based message based on matching semantic tags from previously analyzed messages stored in a learned knowledge repository in accordance with the present invention.

FIGS. 2 and 3 show methods using the learned knowledge repository to generate a response to a select text-based message, such as newly received customer e-mails or other text-based messages. Initially in step 100, 200, a message $T_{select}$, for which a response needs to be generated, is received through a message network or selected from a collection of such messages. It should be understood that the system of the present invention can preferably generate responses automatically as messages arrive or can process large groups of such messages. Thereafter, the received/selected message $T_{select}$ is preferably analyzed 110, 210 using the syntactic and/or semantic approaches described above. Thus, a syntactic analysis in step 110 preferably defines sentences and clauses for the message $T_{select}$. A semantic analysis 210 preferably further assigns semantic tags to the clauses. In step 120, 220 both methods access the learned knowledge repository to correlate properties from the new message $T_{select}$ to historical messages stored therein. Thereafter, both methods vary somewhat and are address separately below.

FIG. 2 shows how in step 120 of the syntactic approach, the repository is accessed, which maintains historical messages previously analyzed. Also, the repository maintains historical input clauses (HIC's) and there associated historical response clauses (HRC's). In step 130, the method preferably statistically calculates the best match between the newly derived input clauses from step 110 with the HIC's. In the next step 140, a set of response clauses are compiled that are presumably responsive to selected message $T_{select}$. The set of response clauses are compiled from the HRC's correlated to the HIC's in the repository. Then in step 150, all the proposed response clauses are reformatted and preferably transmitted to the customer. In this way, a new agent response message in conveyed to the customer. It should be understood that in addition to the reformatted response clauses, additional metadata or boilerplate messages can be automatically added to the response message before being conveyed to the customer.

One or more methods can be used to calculate the best match between the input clauses from $T_{select}$ with the HIC's. A word-level match can be used, where the words of the input clauses and the words of the HIC's are matched against each other. Alternatively, a phrase-level match can be used that matches a series of contiguous words from the input clause to the HIC's. As a further alternative, a tree-level match can be used. The tree level match uses sets of two or more associated clauses from $T_{select}$ to match to similarly associated HIC's. The tree-level match can also be done among the nodes of a tree and their local tree context (e.g. ancestor nodes, sibling nodes and descendent nodes). A threshold can be used to decide on the degree of match in all of these cases. Methods that involve a match using a machine learning approach can also be used for this purpose. The relative importance of each type of match and the thresholds that are needed to decide on how well something matches can be set using machine learning programs.

Alternatively, FIG. 3 shows how in step 220 of the semantic approach the repository is also accessed. The repository, using the semantic approach, preferably maintains historical response clauses (HRC's) associated with tags from the historical input tags. In step 230, the method preferably translates HIT's into proposed response clauses based on the associated HRC's. Thereafter, in 240, a set of response clauses based on the compiled HRC's are compiled that are presumably responsive to selected message $T_{select}$. Finally, in step 250 a new agent response message is finalized and conveyed to the customer.

In addition to the methods used for the syntactic approach discussed above, the semantic match of the clauses can also be done using a classifier. The historical clauses with their semantic annotations can be used to train a classifier. The input clauses are then classified using the classifier and the semantic tag predicted by the classifier is used for selecting the historical response clauses.

The historical response clauses selected in the above methods are preferably arranged in a well-formed text. All possible orderings of the clauses are ranked using a sequence model that assigns preference scores for each of the orderings. This ranking model is often called the language model and it is typically used on a sequence of words. The language model is made to rank the order of the different sequences of clauses. The highest ranking sequence is selected as the resulting outbound response.

Figure 4:
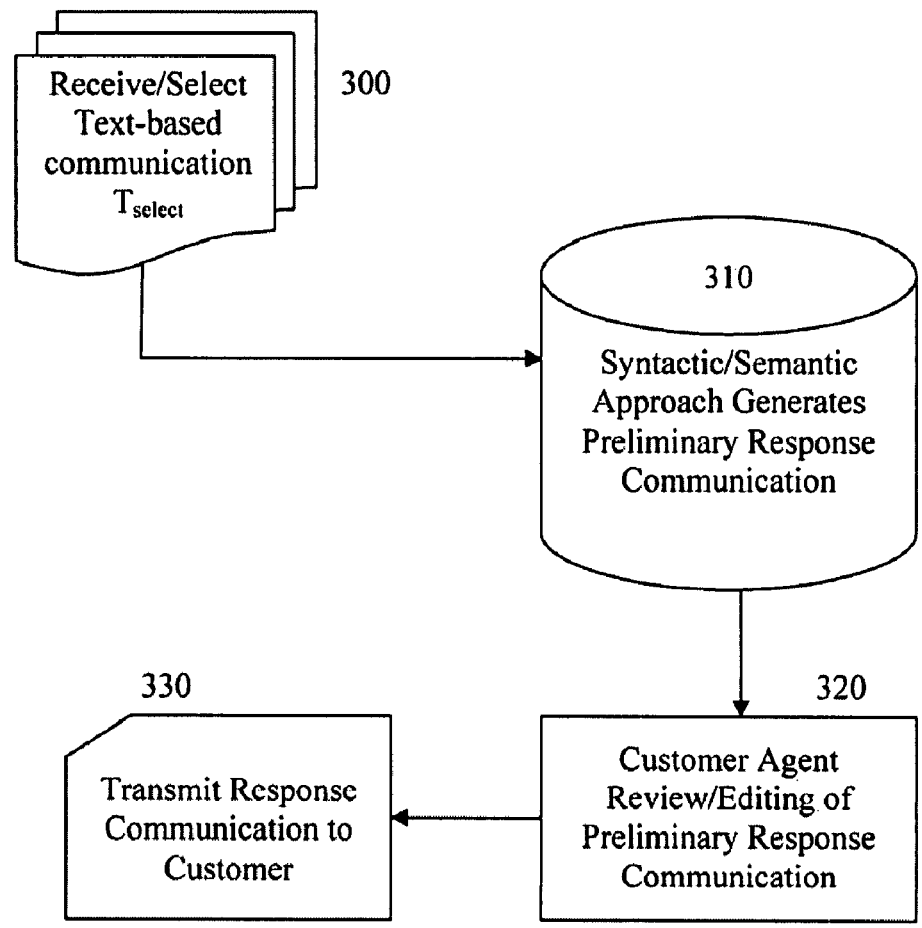
FIG. 4 is a block diagram that shows a response message generated after being reviewed and/or edited by a customer agent in accordance with an alternative embodiment of the present invention.

FIG. 4 shows additional steps that can be taken when generating final customer responses. In step 300 a text-based customer message is received and/or selected. Thereafter in step 310, the message is analyzed and processed using the syntactic and/or the semantic approaches discussed above. Step 310 preferably generates a preliminary response message. Preferably, the preliminary response message is generated with little or no customer agent involvement. In other words, preferably the preliminary response message is generated exclusively through an automated process. In step 320, the preliminary response message is preferably forwarded to a customer agent for review and/or editing. Thereafter in step 330, an approved and/or revised response message is transmitted to the customer. It should be understood that it is preferable that the message transmitted to the customer be generated with little or no customer agent involvement. However, due to the nature of certain messages and the desire for improved readability and understanding of the responses, it can be beneficial to have the message reviewed by an agent before being sent to the customer.

The described system preferably uses a standard desktop computer with sufficient memory to store and manipulate data. The computer readable medium used to implement the methods described above preferably employ a preprocessor for extracting the content and headers of emails, a chunker to split the input customer message and the output response message into clauses, a parser that constructs a syntactic structure for the clauses, a classifier that predicts the semantic classes for the clauses and a response generator that uses the information produced by these analysis components to construct a response. The response text is alternatively presented to a human agent for inspection and further editing.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of generating a response to a text-based natural language message, comprising:
   identifying a sentence in the text-based natural language message;
   identifying an input clause in the sentence;
   comparing the input clause to a previously received clause, the previously received clause being correlated with a previously generated response message; and
   generating an output response message based on the previously generated response message, the output response message being derived from a plurality of previously generated response clauses.

2. A method according to claim 1, further comprising storing the previously received clause and the previously generated response in a database.

3. A method according to claim 1, further comprising parsing the input clause, thereby defining a relationship between words in the input clause.

4. A method according to claim 1, further comprising identifying a best match clause for the input clause, the best match clause having a threshold degree of match and being non-identical to the input clause, the best match clause being derived from the previously received clause.

5. A method according to claim 4, wherein the best match clause is identified using two or more associated clauses from the text-based natural language message to match similarly associated clauses from a previously received message associated with the previously received clause.

6. A method according to claim 1, further comprises correlating the previously received clause with a one of the plurality of previously generated response clauses.

7. A method according to claim 1, further comprising:
   associating a semantic tag with the input clause, the semantic tag being an abbreviation associated with the input clause; and
   identifying an output response clause based on the associated semantic tag.

8. A method according to claim 7, further comprising correlating the semantic tag with the previously received clause.

9. A method according to claim 1, further comprising displaying the output response message.

10. A method according to claim 9, further comprising transmitting the output response message displayed to the customer service agent.

11. A method according to claim 1, wherein the plurality of previously generated response clauses include a first response clause and a second response clause, the first response clause being derived from a first previously generated response message, the second response clause being derived from a second previously generated response message different from the first previously generated response message.

12. A method according to claim 1, wherein the comparison of the input clause and the previously received clause includes matching a first classifier generated for the input clause with a second classifier generated for the previously received clause.

13. A non-transitory computer-readable storage medium storing instructions that, when executed by a processing device, causes the processing device to generate a response to a text-based natural language message by:
   identifying a sentence in the text-based natural language message;
   identifying an input clause in the sentence;
   comparing the input clause to a previously received clause, the previously received clause being correlated with a previously generated response message; and
   generating an output response message based on the previously generated response message, the output response message being derived from a plurality of previously generated response clauses.

14. A non-transitory computer-readable storage medium according to claim 13, wherein storing instructions that, when executed by a processing device, causes the processing device to generate a response to a text-based natural language message by parsing the input clause, thereby defining a relationship between words in the input clause.

15. A non-transitory computer-readable storage medium according to claim 13 storing instructions that, when executed by a processing device, causes the processing device to generate a response to a text-based natural language message by identifying a best match clause for the input clause, the best match clause having a threshold degree of match and being non-identical to the input clause, the best match clause being derived from the previously received clause.

16. A non-transitory computer-readable storage medium according to claim 13 storing instructions that, when executed by a processing device, causes the processing device to generate a response to a text-based natural language message by associating a semantic tag with the input clause, the semantic tag being an abbreviation associated with the input clause; and
   identifying an output response clause based on the associated semantic tag.

17. A non-transitory computer-readable storage medium according to claim 16 storing instructions that, when executed by a processing device, causes the processing device to generate a response to a text-based natural language message by correlating the semantic tag with the previously received clause.

18. A non-transitory computer-readable storage medium according to claim 13 storing instructions that, when executed by a processing device, causes the processing device to generate a response to a text-based natural language message by, wherein the plurality of previously generated response clauses include a first response clause and a second response clause, the first response clause being derived from a first previously generated response message, the second response clause being derived from a second previously generated response message different from the first previously generated response message.

19. A non-transitory computer-readable storage medium according to claim 13 storing instructions that, when executed by a processing device, causes the processing device to match a first classifier generated for the input clause with a second classifier generated for the previously received clause.

20. A non-transitory computer-readable storage medium according to claim 15 storing instructions that, when executed by a processing device, causes the processing device to identify the best match clause using two or more associated clauses from the text-based natural language message to match similarly associated clauses from a previously received message associated with the previously received clause.

* * * * *